United States Patent [19]

Takahashi et al.

[11] 4,412,044
[45] Oct. 25, 1983

[54] RING-OPENED NORBORNYL POLYMERS

[75] Inventors: Hiroshi Takahashi; Katsuhiro Abe, both of Yokkaichi, Japan

[73] Assignee: Mitsubishi Petrochemical Company Limited, Tokyo, Japan

[21] Appl. No.: 360,908

[22] Filed: Mar. 23, 1982

[30] Foreign Application Priority Data

Mar. 27, 1981 [JP] Japan ................................. 56-44923

[51] Int. Cl.³ ............................................. C08F 8/12
[52] U.S. Cl. ................................. 525/329.5; 524/106; 525/366; 525/367; 525/369; 526/141; 526/142; 526/283
[58] Field of Search ................ 526/283; 525/366, 367, 525/369, 329.5

[56] References Cited

FOREIGN PATENT DOCUMENTS 49-77999  7/1974  Japan .
50-65599  6/1975  Japan .
56-65018  6/1981  Japan .
1546775   5/1979  United Kingdom .

Primary Examiner—Stanford M. Levin
Attorney, Agent, or Firm—Robert E. Burns; Emmanuel J. Lobato; Bruce L. Adams

[57] ABSTRACT

Polymers consisting essentially of the units (A) and (B) with an intrinsic viscosity in the range of 0.3 to 4.0, a content of the unit (A) of 10 to 90 mol % of the total structural units and a content of double bonds of trans-configuration of 40% or more are disclosed. The units (A) and (B) are represented by the structural formulas:

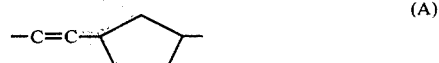

(A)

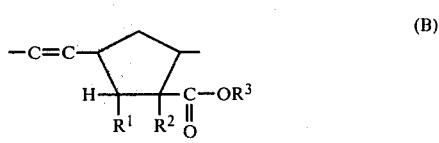

(B)

wherein $R'$ is hydrogen atom, an alkyl or phenyl, $R^2$ is hydrogen or an alkyl, $R^3$ is an alkyl. The polymers are preferably prepared by partial hydrolysis of the polymers consisting essentially of the unit (B).

13 Claims, No Drawings

RING-OPENED NORBORNYL POLYMERS

BACKGROUND OF THE INVENTION

1. Field of the Art

This invention relates to a resin which contains 5-membered rings and double bonds in the main polymer chain thereof, is very reactive and also has excellent properties of heat resistance, stiffness and high impact resistance.

Currently in petrochemical industries, the naphtha of petroleum fractions is thermally cracked or decomposed to produce olefins such as ethylene and propylene. These olefins are used as the starting materials for a variety of chemicals such as ethylene oxide and acrylic acid or for a variety of synthetic resins such as polyethylene and polypropylene.

The $C_5$ fractions having 5 carbon atoms obtained as by-products in the thermal cracking of naphtha have hardly been utilized. Of these $C_5$ fractions, only isoprene is industrially used as material for production of synthetic rubbers, and most of the fractions are consumed as fuels.

2. Prior Art

Of these $C_5$ fractions, cyclopentadiene is obtained in the largest amount. Cyclopentadiene is so reactive that the conversion of cyclopentadiene to a novel high-value products such as cyclopentene and norbornene derivatives is expected.

Especially interesting as novel engineering plastics is a polymer obtained by subjecting a norbornene derivative monomer to ring-opening polymerization in the presence of a metathesis catalyst such as tungsten or molybdenum. More specifically, a ring-opened polymer of 5-norbornene-2-carboxylic acid, if it can be obtained by subjecting cyclopentadiene and acrylic acid to the Diels-Alder reaction, is expected to provide an engineering plastic having high heat resistance because of its carboxylic acid groups. The ring-opening polymerization, however, does not take place because of the strong polarity of the carboxylic acid groups. Thus, in the present condition, it is industrially impossible to subject 5-norbornene-2-carboxylic acid to ring-opening polymerization directly.

On the other hand, a process for subjecting such ester compounds as methyl 5-norbornene-2-carboxylate or ethyl 5-norbornene-2-carboxylate to ring-opening polymerization in the presence of a metathesis catalyst has been disclosed by Japanese Patent Laid-Open No. 77999/1974. The ring-opened polymer which consists of the ester compound alone, is inferior in heat resistance and high impact property, has limited uses, and lacks industrial values for resin materials.

The present inventors have once proposed a process for preparation of the ring-opened polymer of 5-norbornene-2-carboxylic acid which comprises dissolving a ring-opened polymer of the above-mentioned ester compound in an organic solvent selected from ketones, tetrahydrofuran, dioxane, dimethylformamide and dimethylsulfoxide, and then reacting the resulting solution by addition thereto of an aqueous alkali solution, and further neutralizing the reaction product by addition thereto of an acid. The resulting polymer having a trans-form content of less than 40%, however, exhibits low heat resistance and also has a little value for industrial uses. The copolymer having a low transform content and consisting of the structural units (A) and (B) not only has low heat resistance but also is inferior in stiffness and high impact property. The uses thereof are also limited.

The ring-opened polymer consisting of 5-norbornene-2-carboxylic acid, even when it has a trans-form content of 40% or more, is not satisfactory with respect to a high impact property, although it has excellent heat resistance. Thus, a notatable feature could not be found especially in the polymer in comparison with other competitive resins.

The present inventors have made intensive researches on the production of such resins, and accomplished the present invention.

SUMMARY OF THE INVENTION

In accordance with the present invention, there is provided a polymer which is fundamentally composed of a structural unit (A) represented by the following general formula,

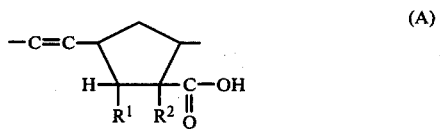

and a structural unit (B) represented by the following general formula,

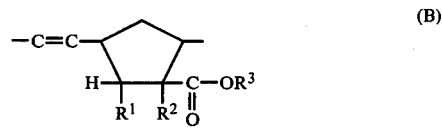

(wherein $R^1$ stands for hydrogen atom, an alkyl group or a phenyl group, $R^2$ stands for hydrogen atom or an alkyl group, and $R^3$ stands for an alkyl group.) and which also satisfies the following requirements (a) through (c);

(a) the intrinsic viscosity of the polymer being in the range of 0.3 to 4.0, (b) the content of the structural unit (A) being 10 to 90 mol % of the total structural units, and (c) the trans-form content of the double bonds in the structural units (A) and (B) being 40% or more.

The ring-opened copolymer having such a structure provides a novel resin having good formability or moldability, in which the impact strength and stiffness as well as heat resistance are well balanced, in the field of resin materials. More specifically, when the content of trans-form double bonds is less than 40% the resulting polymer has poor stiffness and impact strength. Even in the case where the content is 40% or more, when the content of the structural unit (A) is less than 10 mol % the heat resistance is worsened, and when the content of the unit (A) is more than 90 mol % the impact strength is deteriorated.

In the field of functional resins such as ion-exchange membranes, chelating membranes and electroconductive materials, the ring-opened copolymer having such a structure is also useful. For example, in the field of chelating membranes, the copolymer reacts with transition metals or alkali- and alkaline earth-metals to form chelate compounds or salts, which is useful for collection of metals or the like. Also in this field, it is possible that the copolymer be provided with such special function that the double bonds are crosslinked after the formation of chelate and the shapes of metals are recorded in the domain.

DETAILED DESCRIPTION OF THE INVENTION

Polymer

The polymer of the present invention is a polymer which is fundamentally composed of a structural unit (A) represented by the formula,

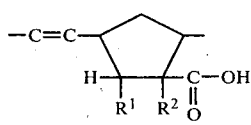
(A)

and a structural formula (B) represented by the formula (B)

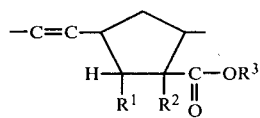
(B)

wherein $R^1$ stands for hydrogen atom, an alkyl group or a phenyl group and preferably hydrogen atom or an alkyl group; and $R^2$ stands for hydrogen atom, or an alkyl group, which may be the same as or different from those of $R^1$ and $R^3$ stands for an alkyl group which may be the same as or different from those of $R^1$. The alkyl group has 1 to 20 and preferably 1 to 8 carbon atoms.

The intrinsic viscosity of these copolymers [$\eta$s/C measured at 30° C. using a tetrahydrofuran solution thereof (concentration of 0.1 g/dl)] is required to have the value of 0.3 to 4.0 and preferably 0.4 to 3.0 irrespective of the composition of the structural formulas (A) and (B). When the viscosity is less than 0.3, the copolymer has inferior heat resistance, and the resulting ordinary compression-molded test pieces are fragile and cannot withstand property tests such as stiffness tests and impact tests. In the case that the viscosity is over 4.0, the formability or moldability is worsened even when the amount of the structural unit (A) is small, and the copolymer is crosslinked at its double bond regions to worsen its shaping property when it is compression-molded at a temperature as high as 350° C. When the viscosity is in the range of 0.3 to 4.0, there is no large difference in the stiffness and impact strength, provided that the composition of the structural units (A) and (B) is the same.

The content of the structural formula (A) given in the general formula is required to be 10 to 90% and preferably 30 to 70 mol % of the total structural units. When the content of the unit (A) is less than 10 mol %, the heat resistance is worsened and the impact strength is also lowered. When the content is over 90 mol %, the impact strength is worsened and the moldability is markedly lowered.

As the content of the unit (A) is increased, the impact strength and heat resistance are enhanced. The impact strength is such that the resin cannot be fractured (420 kg.cm/cm or more) according to the current JIS (Japanese Industrial Standards) testing method when the content of the unit (A) is over 10 mol %, but the strength is rapidly deteriorated when the content is over 90 mol %.

Moreover, the content of trans-form double bonds in the above-mentioned structural units (A) and (B) is required to be 40% or more and preferably 45% or more. The term "trans-form double bonds" herein means that the linking position of the 5-membered ring forms the trans-form configuration to the plane which is formed by the carbon-carbon double bonds in the structural units (A) and (B). When the content of the trans-form is less than 40%, the heat resistance and stiffness is worsened.

For example, when the trans-form content is 35%, the result is that the heat-deformation temperature is 32° C., the stiffness is 12,000 kg/cm² and the Izod impact strength is 56 kg.cm/cm and thus the balance of properties is markedly reduced. In the case where the content of the trans-form is over 40% by weight, there is no large difference in the properties such as stiffness, impact strength and heat resistance, provided that the content of the structural unit (A) is the same.

Preparation of the Polymer

1. The ring-opened polymer of 5-norbornene-2-carboxylic acid esters

The 5-norbornene-2-carboxylic acid ester used in the present invention is synthesized generally by subjecting cyclopentadiene and acrylates or α-alkyl-substituted acrylates to the Diels-Alder reaction.

Further, the norbornene derivative monomers having these ester groups such as methyl 5-norbornene-2-carboxylate, methyl 5-norbornene-2,2-methylcarboxylate, ethyl 5-norbornene-2-carboxylate and octyl 5-norbornene-2-carboxylate are readily polymerized through ring opening in the presence of a metathesis catalyst.

As the metathesis catalyst to be used in the present invention, a catalyst composed of the combination of a tungsten or molybdenum compound can be used as the main catalyst component, an organoaluminum compound as the co-catalyst compound, and an electron donor as the third component.

In the metathesis catalysts, a tungsten or molybdenum compound is generally used as a transition metal component. In this case, a molybdenum compound has poor activity, and a tungsten compound is preferred because of its high activity. Especially suitable is a halogen compound of tungsten. The organoaluminum compound is not especially restricted. Ordinary alkylaluminum compounds can be used such as triloweralkylaluminums, diloweralkylaluminum halides, loweralkylaluminum sesquihalides, e.g. triethylaluminum, diethylaluminum monochloride and ethylaluminum sesquichloride.

The amount of the organoaluminum component to be added is generally in the range of 0.5 to 5.0 atoms and preferably 2.0 to 3.0 atoms per atom of tungsten or molybdenum.

As the third component, an electron donor, can be used an alcohol having 1 to 8 carbon atoms such as methyl alcohol, ethyl alcohol and 2-ethylhexyl alcohol; a phenol; an aliphatic ether such as dimethyl ether and diethyl ether; a cyclic ether such as tetrahydrofuran, dioxane and trioxane; an aliphatic amine or diamine such as ethylene diamine; or a nitrogen-containing heterocyclic compound such as pyridine and lutidine.

For increasing the trans-form content, it is preferred to use an aliphatic amine or diamine, or a nitrogen-containing heterocyclic compound. The amount of the electron donor to be added is in the range of 0.5 to 5 moles and preferably 1 to 3 mols per mol of tungsten or molybdenum.

As the solvent, a halohydrocarbon, an aromatic hydrocarbon or an aromatic halohydrocarbon can be used. Especially, an aromatic hydrocarbon such as toluene or an aromatic halohydrocarbon such as chlorobenzene is suitable for obtaining a high trans-form content polymer.

The polymerization is carried out at atmospheric pressure satisfactorily, and can also be carried out under a pressurized condition if desired.

The polymerization temperature is in the range of −20° to +70° C. The desired polymer will not be obtained outside of the temperature range, because the catalytic activity is markedly lowered at too low temperatures and the trans-form content is lowered at too high temperatures. Then, the polymerization temperature is preferably selected in the range of about 0° C. to about 40° C.

There is no special rule for the process of obtaining the desired polymer having a trans-form content of 40% by weight or more. Such a polymer, however, can be obtained by controlling the following factors.

A polymerization temperature in the range of 0° to 40° C. is suitable. As described above, when the temperature is too low, the polymer can hardly be obtained because the catalytic activity is markedly lowered. On the other hand, when the temperature is too high, the desired polymer cannot be obtained because the trans-form content is lowered. Moreover, when the temperature is over 70° C., the catalytic activity is markedly lowered and thus the polymer is hardly obtained.

With respect to the amount of catalyst to the amount of the monomer, the trans-form content of the resulting polymer is lowered as the catalyst amount is decreased. Especially in the case of tungsten compounds, when the molar ratio of the tungsten compound charged to the monomer charged is 0.001 or less, the trans-form content of the resulting polymer is 40% or less. On the other hand, when the molar ratio is 0.1 or more, the molecular weight of the resulting polymer is smaller and the desired polymer will not be obtained. Thus, a suitable range of molar ratio is 0.003 to 0.05.

One of the factors for controlling the trans-form content is the type of organoaluminum compounds in the catalyst. For increasing the trans-form content, it is suitable to use an organoaluminum compound having a high reducing activity such as a trialkylaluminum or a dialkylaluminum monohalide. Although the use of an alkylaluminum sesquihalide alone results in a polymer having a low trans-form content, the trans-form content can be increased by the combination thereof with the following third component having a strong electron-donor property.

The use of the third component having a higher electron-donor property produces a polymer having a higher trans-form content. Especially for this purpose, a nitrogen-containing compound is preferred over an oxygen-containing compound as the electron donor.

The ring-opened polymer obtained via polymerization through ring opening is a ring-opened polymer of a 5-norbornene-2-carboxylic acid ester comprising the repeating unit represented by the following general formula and generally has a molecular weight of 10,000 to 350,000;

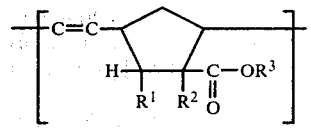

wherein $R^1$ stands for hydrogen atom, an alkyl group or a phenyl group, $R^2$ for hydrogen atom or an alkyl group, and $R^3$ for an alkyl group.

The above-mentioned ring-opened polymer itself has a low heat-resistant property because it is an ester-substituted polymer. Thus, the ester-substituted polymer alone cannot be used as a practical heat-resistant resin.

To convert the resin to the ring-opened copolymer having the structural units of the present invention, the resin must be subjected to hydrolysis. The methods for such a hydrolysis procedure include a solution method as described in Japanese Patent Laid-open No. 65018/1981 and an emulsion method as described in Japanese patent application No. 104514/1981 specification which were filed by the present inventors. Although either of these methods can be applied to the present invention, the hydrolysis procedure is explained in the following by way of the solution method.

2. Dissolution of the ring-opened polymer

The ring-opened polymers of the 5-norbornene-2-carboxylic acid esters having the above-mentioned ester groups are dissolved in an organic solvent which dissolves the polymer and which is miscible with water, whereby industrially advantageous hydrolysis can be carried out.

A suitable organic solvent in the present invention is exemplified by ketones, tetrahydrofuran, dioxane, dimethylformamide and dimethylsulfoxide. The ketones include acetone, methyl ethyl ketone, diethyl ketone and the like.

The amount of these organic solvents to be added is generally 5 to 50 parts by weight to 1 part by weight of the above-mentioned ring-opened polymer. By addition of such an amount of the solvent, a uniform solution is obtained.

3. Hydrolysis

The ester groups contained in the ring-opened polymer are then subjected to alkali-hydrolysis to obtain the structural units (A) and (B) desired in the present invention. An alkali metal hydroxide or an alkaline earth metal hydroxide or a salt thereof with a weak acid can be used as the alkali. Of these alkaline compounds, especially preferred are sodium hydroxide, potassium hydroxide and lithium hydroxide which are alkali metal hydroxides, and sodium carbonate, sodium acetate and potassium acetate which are the salts with weak acids.

The amount of the alkali to be used depends on the viscosity of the ring-opened polymer. When the amount is from 0.1 mol to less than 4 mols per mol of the ester group unit in the ring-opened polymer, the ester groups are partially hydrolyzed and a copolymer having the structural unit (A) and the structural unit (B) is obtained.

Accordingly, the amount of the alkali is increased in the case where heat resistance is required, and the amount is decreased to leave the ester groups partially in the case where the moldability is more important. In other words, it is possible to design the materials having the properties required for various uses.

Thus, the amount of the alkali to be used is in the range of 0.8 to 4 mols and preferably 0.8 to 2 mols where heat resistance is required, and in the range of 0.1 to 1.2 mols and preferably 0.1 to 0.9 mols where the high impact property or formability or moldability is required.

The amount of water to be added depends on the concentration of the polymer solution, and is in the range of 5 to 20 parts and preferably 7 to 15 parts by weight to 100 parts by weight of the solvent. When a small amount of water is added, hydrolysis of the ester takes a long time. When a large amount of water is added, separation takes place at an early stage depending on the concentration of the polymer and the ester hydrolysis cannot be completed.

The temperature of hydrolysis is selected in the range of 40° to 200° C. The ester hydrolysis is substantially completed in 1 to 3 hours at a temperature of 50° to 80° C. When the degree of hydrolysis is high, precipitation takes place. Because the hydrolysis system is uniform in the case of a low degree of hydrolysis, 1 to 10 parts and preferably 1 to 3 parts by volume of an alcohol such as methanol, ethanol, propanol, isopropanol and butanol are added per part by volume of the solvent to accelerate precipitation of the polymer.

After separating the resulting precipitates and the solvent, 5 to 50 parts by weight of water are added per part by weight of the polymer. The mixture is dissolved or suspended under stirring. Thereto is then added 1 to 10 equivalents of an acid such as hydrochloric acid, nitric acid, acetic acid and sulfuric acid per equivalent of the carboxylic acid salt in the ring-opened polymer to convert the side chain to a carboxylic acid group.

In the case where the emulsion method is employed, the ring-opened polymer is dissolved in a water-immiscible solvent; for example, in an aromatic solvent such as benzene, toluene and xylene, an aliphatic solvent such as hexane and heptane, or a halohydrocarbon solvent such as trichloroethylene and perchloroethylene. The resulting solution is added to water containing an emulsifier under stirring to emulsify the system, followed by addition thereto of an aqueous alkali solution. Thus, hydrolysis can be effected.

The subsequent operations such as an acid treatment can be conducted in a similar way to the procedures of the above-described solution method.

The present invention will be explained in detail by way of the following examples.

The compositional ratio in the ring-opened polymer was obtained by determination of the resulting polymer by means of an infrared absorption spectrum method, wherein 100% methyl 5-norbornene-2-carboxylate ring-opened polymer and 100% 5-norbornene-2-carboxylic acid ring-opened polymer were used as the standard substance.

The heat-deformation temperature was measured in accordance with JIS (Japanese Industrial Standard) K-7207-1974, the Izod impact strength with JIS·K-7110-1971, and the three-point bending stiffness with JIS·K-7203-1973, respectively. In the Izod impact strength test, a 3-ply sheet composed of 3 sheets of 2 mm each in thickness was used as a test piece.

The trans-form content of the polymer was determined by the spectra in the double-bond regions according to a $^{13}C$-NMR spectrum method.

The intrinsic viscosity ($\eta s/C$) of the ring-opened polymer was measured at 30° C. in tetrahydrofuran (concentration 0.1 g/dl).

EXAMPLE 1

A dry flask was purged with nitrogen, and then charged with 400 parts by weight of toluene used as a solvent and 100 parts by weight of methyl 5-norbornene-2-carboxylate used as a monomer. The temperature of the liquid was adjusted to 15° C. Thereto was added 2.6 parts by weight of tungsten hexachloride and then 3-fold molds of diethylaluminum monochloride based on the molar amount of the tungsten hexachloride was added, followed by addition of 2-fold mols of n-butanol (n-BuOH) based on the molar amount of the tungsten hexachloride. The mixture was then subjected to ring-opening polymerization for 10 hours. After the termination of the polymerization reaction, a solution of 15% by weight of a concentrated hydrochloric acid and 3-fold volume of methanol based on the volume of the charged toluene was added to the flask. The resulting mixture was subjected to catalytic decomposition. The product was then treated by re-precipitation processes twice using tetrahydrofuran as a solvent and methanol as a precipitant and dried to obtain 99 parts by weight of a polymer. The intrinsic viscosity of the resulting polymer was 0.55, and the trans-form content thereof was 55%.

To a vessel were charged 100 parts by weight of the ring-opened polymer pellets and then 1,000 parts by weight of acetone. The temperature of the resulting system was raised to 56° C. Thus the polymer was completely dissolved under stirring.

Then, 14 parts by weight of potassium hydroxide based on the weight of the ring-opened polymer was dissolved in 60 parts of water based on 100 parts by weight of the charged acetone. The resulting solution was slowly added to the above-described acetone solution, while the system was kept uniform. As hydrolysis of the ester proceeded, the ring-opened polymer was separated out of the system. After continuing the reaction for 2 hours, the product was separated by filtration.

The separated ring-opened polymer was put in 800 parts by weight of water and swollen under stirring. Then, 65 parts by weight of a concentrated hydrochloric acid diluted with 200 parts by weight of water was added thereto, followed by stirring at normal temperature. As the side chains of the polymer were converted from a carboxylate to the corresponding free carboxylic acid, the ring-opened polymer precipitated in the form of white powder. By separating the powder by filtration, the desired ring-opened copolymer of 5-norbornene-2-carboxylic acid and methyl 5-norbornene-2-carboxylate was obtained.

The properties of the resulting copolymer are shown in Table 1.

EXAMPLE 2

The process of Example 1 was repeated by changing the ring-opening polymerization time to 1 hour, to obtain a ring-opened polymer of methyl 5-norbornene-2-carboxylate having an intrinsic viscosity of 2.8 and a trans-form content of 52%.

Hydrolysis was carried out under substantially the same charging conditions and reaction conditions as in Example 1 to obtain a ring-opened copolymer.

EXAMPLE 3

The process of Example 1 was repeated except that octyl 5-norbornene-2-carboxylate was used instead of methyl 5-norbornene-2-carboxylate monomer, to obtain a polymer having an intrinsic viscosity of 0.62 and a trans-form content of 50%.

Hydrolysis was carried out under substantially the same charging conditions and reaction conditions as in Example 1, to obtain a copolymer of 5-norbornene-2-carboxylic acid and octyl 5-norbornene-2-carboxylate.

EXAMPLE 4

The process of Example 1 was repeated except that methyl 3-phenyl-5-norbornene-2-carboxylate was used instead of methyl 5-norbornene-2-carboxylate monomer, to obtain a polymer having an intrinsic viscosity of 0.43 and a trans-form content of 50%.

Hydrolysis was carried out under substantially the same charging conditions and reaction conditions as in Example 1, to obtain a ring-opened copolymer of 3-phenyl-5-norbornene-2-carboxylic acid and methyl 3-phenyl-5-norbornene-2-carboxylate.

EXAMPLE 5

The process of Example 1 was repeated, and hydrolysis was carried out under substantially the same charging condition and reaction condition as in Example 1 except that 35 parts by weight of potassium hydroxide were used instead of 14 parts by weight. Thus a ring-opened copolymer was obtained.

EXAMPLE 6

The process of Example 1 was repeated, and hydrolysis was carried out under substantially the same charging conditions and reaction conditions as in Example 1 except that 7 parts by weight of potassium hydroxide were used instead of 14 parts by weight. Thus a ring-opened copolymer was obtained.

EXAMPLE 7

The process of Example 1 was repeated except that the ring-opening polymerization was carried out by changing n-BuOH to 2,6-lutidine, to obtain a ring-opened polymer having an intrinsic viscosity of 0.65 and a transform content of 74%. Hydrolysis was carried out substantially under the same charging conditions and reaction conditions as in Example 1 to obtain a ring-opened copolymer.

COMPARATIVE EXAMPLE 1

The properties of the ring-opened polymer of methyl 5-norbornene-2-carboxylate prepared in Example 1 were measured, and are shown in Table 2.

COMPARATIVE EXAMPLE 2

In the process of Example 1, hydrolysis was carried out under substantially the same charging conditions and reaction conditions except that 50 parts by weight of potassium hydroxide were used. The resulting copolymer was a homopolymer of 5-norbornene-2-carboxylic acid, the properties of which are shown in Table 2.

COMPARATIVE EXAMPLE 3

In the conditions of ring-opening polymerization employed in Example 1, the polymerization was carried out with the amount of tungsten hexachloride changed to 0.3 part by weight, the type of alkylaluminum to triethylaluminum, the solvent toluene to chlorobenzene, and the polymerization temperature to 40° C. The resulting ring-opened polymer had an intrinsic viscosity of 1.4 and a trans-form content of 35%. The polymer was then treated under substantially the same charging conditions and reaction conditions as in Example 1, to obtain a ring-opened copolymer. The properties of the copolymer are shown in Table 2.

TABLE 1

| Example No. | Intrinsic viscosity | Trans-form content (%) | Compositional ratio (%) Carboxylic acid | Ester | Heat-deformation temperature (°C.) | Izod impact strength (Kg·cm/cm²) | Three-point bending elasticity modulus (Kg/cm²) |
|---|---|---|---|---|---|---|---|
| 1 | 0.55 | 55 | 40 | 60 | 77 | >420 | 22,300 |
| 2 | 2.8 | 52 | 40 | 60 | 86 | >420 | 21,800 |
| 3 | 0.62 | 50 | 43 | 57 | 73 | >420 | 22,400 |
| 4 | 0.43 | 50 | 48 | 52 | 66 | >420 | 20,900 |
| 5 | 0.55 | 55 | 88 | 12 | 115 | >420 | 24,500 |
| 6 | 0.55 | 55 | 22 | 78 | 68 | >420 | 21,400 |
| 7 | 0.65 | 74 | 45 | 55 | 88 | >420 | 25,100 |

TABLE 2

| Items | Intrinsic viscosity | Trans-form content (%) | Compositional ratio (%) Carboxylic acid | Ester | Heat-deformation temperature (°C.) | Izod impact strength (Kg·cm/cm²) | Three-point bending elasticity modulus (Kg/cm²) |
|---|---|---|---|---|---|---|---|
| Example 1 | 0.55 | 55 | 40 | 60 | 77 | >420 | 22,300 |
| Comparative Example 1 | 0.55 | 55 | 0 | 100 | 48 | 41 | 19,800 |
| Comparative Example 2 | 0.55 | 55 | 100 | 0 | 123 | 12 | 24,300 |
| Comparative Example 3 | 1.4 | 35 | 48 | 52 | 55 | 56 | 18,000 |

What is claimed is:

1. A polymer which consists essentially of receiving structural units (A) represented by the following formula,

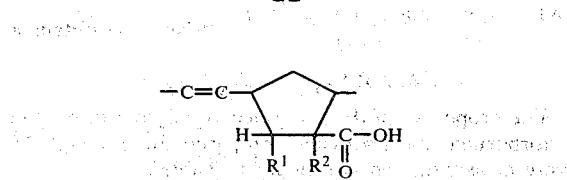

and receiving structural units (B) represented by the following formula,

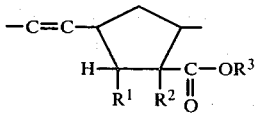

wherein $R^1$ stands for hydrogen atom, an alkyl group or a phenyl group, $R^2$ stands for hydrogen atom or an alkyl group, and $R^3$ stands for an alkyl group, and which also satisfies the following requirements (a) through (c);

(a) the intrinsic viscosity of the polymer being in the range of 0.3 to 4.0, (b) the content of the structural unit (A) being 10 to 90 mol % of the total structural units, and (c) the trans-form content of the double bonds in the structural units (A) and (B) being 40% or more.

2. The polymer according to claim 1, in which the trans-form content is 45% or more.

3. The polymer according to claim 1, in which the content of the structural unit (A) is 30 to 70 mol % of the total structural units.

4. The polymer according to claim 1, which is a polymer especially excellent in impact property having the structural unit (A) content of 10 to 70 mol %.

5. The polymer according to claim 4, in which the content of the structural unit (A) is 20 to 50 mol %.

6. The polymer according to claim 1, which is a polymer excellent in heat resistance having the structural unit (A) content of 40 to 90 mol %.

7. The polymer according to claim 6, which is a polymer especially excellent in heat resistance having the structural unit (A) content of 50 to 90 mol %.

8. A process for preparation of a polymer which consists essentially of receiving structural units (A) represented by the following formula,

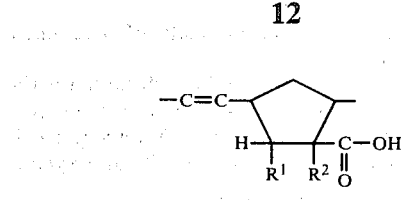

and receiving structural units (B) represented by the following formula,

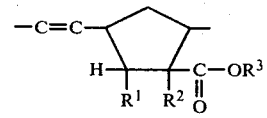

wherein $R^1$ stands for hydrogen atom, an alkyl group or a phenyl group, $R^2$ stands for hydrogen atom or an alkyl group, and $R^3$ stands for an alkyl group wherein the unit (A) comprises 10 to 90% of the units (A) and (B), which comprises treating with an aqueous alkali solution a ring-opened polymer having recurring units of the following formula wherein the trans-form content of the double bonds is 40% or more and then treating the resulting polymer with an acid,

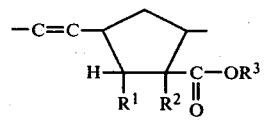

wherein $R^1$ stands for hydrogen atom, an alkyl group or a phenyl group, $R^2$ stands for hydrogen atom or an alkyl group, and $R^3$ stands for an alkyl group.

9. The process according to claim 8, in which the ring-opened polymer is dissolved in a solvent and then is subjected to the alkali treatment.

10. The process according to claim 8, in which the ring-opened polymer is emulsified and contacted with an alkali.

11. The polymer according to claim 1 in which the intrinsic viscosity of the polymer is in the range of 0.4 to 3.

12. The polymer according to claim 1 in which the intrinsic viscosity of the polymer is in the range of 0.4 to 3 and the trans-form content of the double bonds is 45% or more.

13. The polymer according to claim 1 in which the intrinsic viscosity of the polymer is in the range of 0.4 to 3, the trans-form content of the double bonds is 45% or more and the content of the structural unit (A) is 30 to 70 mol % of the total structural units.

* * * * *